3,076,017
METHODS FOR PREPARING SALICYLIC ACID ESTERS

Daniel W. Grisley, Jr., Dayton, Ohio, assignor to Monsanto Chemical Company, St. Louis, Mo., a corporation of Delaware
No Drawing. Filed Feb. 23, 1960, Ser. No. 10,031
7 Claims. (Cl. 260—474)

This invention relates to salicylic acid or O-hydroxybenzoic acid. More particularly, this invention relates to methods for preparing the salicylic acid esters from the aryloxide salts, carbonyl sulfide, and an alcohol. This invention especially contemplates the preparation of the alkyl salicylates, including the alkyl substituted salicylates.

It is disclosed and claimed in U.S. Patent 2,824,892 that salicylic acid is formed by reacting sodium phenate with carbon dioxide in an anhydrous solution comprising an alkanol and phenol. In view of the often recognized apparent equivalents of sulfur and oxygen, it would be expected that the corresponding hydroxythiobenzoic acid would be produced when the same reaction is carried out using carbonyl sulfide in place of carbon dioxide.

I have now discovered, much to my surprise, that the reaction of sodium phenate with carbonyl sulfide, instead of carbon dioxide, in an anhydrous solution of an alkanol and a phenol results in the formation of an ester of salicylic acid and not in the formation of the expected hydroxythiobenzoic acid.

An object of this invention is to prepare esters of salicylic acids in a simple and direct one-step process.

Another object of this invention is to prepare esters of salicylic acid without first preparing the salicylic acid.

Another object of this invention is to provide a process for the preparation of esters of salicylic acid from an aryloxide salt, carbonyl sulfide, and an alkanol.

Other aspects, objects and advantages of this invention are apparent from a consideration of the accompanying disclosure and the appended claims.

According to the present invention, aryloxide salts are interacted with carbonyl sulfide and an alkanol at an elevated temperature in an anhydrous phenol reaction medium to form an ester of salicylic acid as illustrated by the following equation:

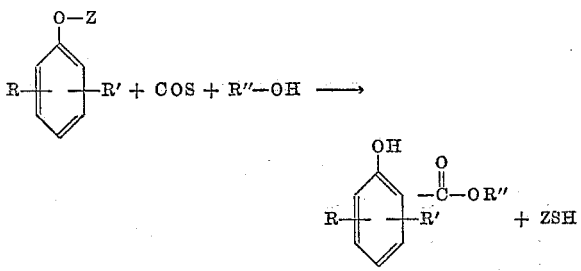

wherein R and R' are selected from the group consisting of hydrogen and alkyl radicals, R and R' being either the same or different, Z is a salt-forming cation selected from the group consisting of alkali metal, alkaline earth metal, and quaternary ammonium cations, and R'' is an alkyl radical.

The aryloxide salt reactants employed in the process of this invention are preferably the alkali metal, alkaline earth metal, or quaternary ammonium phenoxides of the formula

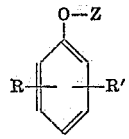

wherein Z is represented by the alkali metal, alkaline earth metal or quaternary ammonium cation. The useful alkali metals are sodium, potassium, and lithium, whereas the useful alkaline earth cations include magnesium, calcium, barium, and strontium. Examples of the quaternary ammonium cations include tetramethyl ammonium and trimethylbenzyl ammonium cations obtained from the corresponding hydroxides. Preferably, the salt-forming cation is an alkali metal because the alkaline earth and quaternary ammonium cations form products which are not so readily separated as the products formed using the alkali metal cations.

R and R' of the aryloxide salt reactant can be either the same or different hydrogen and/or alkyl radicals, preferably, alkyl radicals having less than 12 carbon atoms. Examples of suitable alkyl radicals include methyl, ethyl, propyl, isopropyl, butyl, pentyl, hexyl, octyl, nonyl, and the like. A preferred aryloxide salt reactant is sodium phenoxide.

Methods for the preparation of the aryloxide salts are well known to those skilled in the art. For example, the sodium phenoxide can be readily prepared by heating a mixture of sodium and phenol in a dry atmosphere in the presence of a solvent such as diethyl carbitol until the sodium has completely reacted.

The alkanol reactants useful in the process of this invention can be any of the alkyl alcohols which preferably contain not more than 20 carbon atoms in either a straight chain or a branched chain configuration. Preferably, the alkyl alcohol is a primary alcohol; however, secondary alcohols can also be employed. If desired, the alkyl alcohol may contain as few as one carbon atom in the alkyl group. Although it is preferred that the alkanol contain not more than 20 carbon atoms, alcohols containing a greater number of carbon atoms can less advantageously be used in the process of this invention since this reaction depends upon the functional groups and not upon the length of the hydrocarbon chain. Examples of some suitable alkyl alcohols, the alkyl group of which is represented by R'' in the equation above, for use in the process of this invention include the methyl, ethyl, isopropyl, sec-butyl, hexyl, isooctyl, decyl, and isodecyl alcohols.

Reaction of the aryloxide salt with the carbonyl sulfide and the alkanol is conducted in an anhydrous phenol reaction medium. In carrying out this reaction, it is absolutely necessary that anhydrous conditions be maintained since the aryloxide salt reverts back to the phenol in the presence of carbonyl sulfide and water, thereby reducing the yield of ester. Although phenol is the preferred solvent, alkyl phenols, including the polyalkylated phenols, can also be used. Preferably, the alkyl phenol will not contain a total of more than 8 carbon atoms in the alkyl groups substituted on the phenol. Examples of some suitable alkyl phenols which can be used as solvents in the process of this invention include 2-methylphenol, 2-ethylphenol, 3,5-dimethylphenol, 3,5-diisopropylphenol, 2,4 - diisobutylphenol, 4 - tert-butylphenol, and 3-octylphenol.

The reaction of this invention is usually carried out at temperatures above 150° C. but below 200° C. although temperatures outside this range can less advantageously be employed. At temperatures much below 150° C. the reaction becomes very slow and uneconomical whereas at temperatures much above 200° C. side reactions usually take place. The reaction mixture is usually maintained at elevated pressure from just above atmospheric pressure to a pressure as high as 1000 p.s.i. or even higher. Preferably, the pressure is maintained within the range of from 50 to 600 p.s.i.

The aryloxide salt, carbonyl sulfide, and alkanol are usually reacted using a stoichiometric excess of the carbonyl sulfide and the alkanol. It is ordinarily undesirable to use an excess of the aryloxide salt because the presence of an excess of this reactant in the reaction zone usually results in the formation of undesired side-reaction products. Although it is preferable to use an excess of the alkanol reactant, a stoichiometric proportion can also be used without difficulty. The phenol solvent is usually used in an amount of 1 mole of phenol per 1 mole of aryloxide salt, and preferably in a much greater amount, sometimes as much as 10 moles of phenol per mole of aryloxide salt.

Reaction of the aryloxide salt with the carbonyl sulfide and the alkanol usually results in the formation of a derivative of the salicylic acid ester wherein the salt-forming cation is associated with the oxygen atom of the hydroxyl group; however, some free salicylic acid ester is also formed. Since the salicylic acid ester is fairly soluble in the usual organic solvents, such as diethyl ether, separation and recovery of the salicylic acid ester can be readily accomplished by extraction, followed by distillation, according to procedures well known to those skilled in the art. The derivative of the salicylic acid ester may be converted into the free ester by acidification with a mineral acid, such as hydrochloric acid, and recovered by extraction with ether, followed by distillation.

The salicylic acid ester products of this invention are usually fairly high boiling colorless liquids which are generally soluble in most organic solvents, including diethyl ether, but which are fairly insoluble in water. Illustrative examples of some salicylic acid esters formed in the process of this invention include:

Methyl salicylate
Isopropyl salicylate
Butyl salicylate
sec-Hexyl salicylate
Isooctyl salicylate
Decyl salicylate
Methyl 4,6-dimethyl salicylate
Methyl 5-butyl salicylate
Isooctyl 3,5-diisopropyl salicylate These esters are particularly useful in pharmaceutical and food preparations; for example, as ultraviolet light absorbers in sun tan lotions and as flavoring agents.

The advantages, desirability and usefulness of this invention are illustrated by the following examples.

*Example 1*

In this example, sodium phenate was reacted with carbon dioxide and isooctyl alcohol using a phenol solvent to obtain salicylic acid as a product without formation of any ester of salicylic acid. The sodium phenate was prepared in the autoclave by heating a mixture of 30 g. (0.75 mole) of sodium hydroxide, 35 ml. of water, 400 ml. of toluene, 200 g. (2.1 mole) of phenol, and 100 ml. of isooctyl alcohol at a temperature of 185° C. under a nitrogen atmosphere for a period of time sufficient to remove the water by azeotropic distillation with the toluene.

Upon completion of the formation of the sodium phenate, the autoclave was sealed and carbon dioxide was pressured therein to a pressure of 80 p.s.i.g. The reaction mixture was then heated at a temperature of 185–190° C. with stirring at a pressure of 60–80 p.s.i.g. for a period of three hours. At the end of this time, the reaction mixture was cooled to room temperature and the excess gas vented from the autoclave. Upon the addition of 200 ml. of water to the reaction mixture in the autoclave, a phase separation occurred. The two phase mixture was acidified with 1:1 hydrochloric acid to obtain a pH of 6. Separation of the phases was then effected and the organic phase was extracted with diethyl ether to recover the phenol and unconverted isooctyl alcohol. The aqueous phase containing the salicylic acid was again acidified with hydrochloric acid until the precipitation of a solid material ceased. The mixture was then filtered and the solid salicylic acid washed on the filter paper with water and dried over potassium hydroxide for 12 hours to obtain 91.5 g. of salicylic acid melting at 161–162° C. No isooctyl ester of the salicylic acid was found in the reaction mixture.

*Example 2*

Sodium phenate was prepared by heating a mixture of 200 g. (2 moles) of phenol, 150 ml. of isooctyl alcohol, 400 ml. of toluene, 30 g. (0.75 mole) of sodium hydroxide, and 30 ml. of water in a 1.4 liter bottom-stirred autoclave at a temperature of 185° C. under an atmosphere of nitrogen until all the water was azeotropically distilled with the toluene. The autoclave was then sealed and cooled to 170° C. before carbonyl sulfide was pressured into the autoclave to obtain a pressure of 80 p.s.i. The reaction mixture was then heated at a temperature of 168–170° C. and a pressure of 80 p.s.i. for 1 hour with stirring. At the end of this time, the reaction mixture was cooled to 70° C. during a period of 1 hour and excess carbonyl sulfide removed by venting through an aqueous potassium hydroxide solution. The autoclave was then opened and 400 ml. of water added to the reaction mixture to form two layers. Without separating the phases, the reaction mixture was cooled to 10° C. and acidified with 1:1 hydrochloric acid. The organic phase present was then separated and washed with 300 ml. of water. The organic phase was then washed with a solution of sodium hydroxide containing 80 g. of NaOH and 1500 ml. of water to obtain an aqueous phase which was again washed with two 200 ml. portions of diethyl ether. The ether phase thus obtained was combined with the organic phase previously washed with sodium hydroxide solution and the mixture dried over magnesium sulfate, filtered and evaporated under vacuum to obtain an oil which was distilled to obtain 43.2 g. of the isooctyl salicylate boiling at 114–116° C./0.25 mm. Hg. Analysis of this compound was found to be 72.01 wt. percent carbon and 8.97 wt. percent hydrogen as compared with calculated values of 71.97 wt. percent carbon and 8.86 wt. percent hydrogen. Structure of this compound was confirmed by an inspection of the infrared spectrum and comparison with the infrared spectrum of an authentic sample of isooctyl salicylate.

*Example 3*

Sodium phenoxide was prepared by heating 30 g. (0.75 mole) of sodium hydroxide, 30 ml. of water, 200 g. (2.1 mole) of phenol, 400 ml. of toluene and 150 ml. of isooctyl alcohol in an autoclave at a temperature of 185° C. under a stream of nitrogen until the water was removed by azeotropic distillation with the toluene. Thereafter, the autoclave was sealed and carbonyl sulfite was introduced until a pressure of 100 p.s.i.g. was obtained. The reaction mixture was then heated at a temperature of 165–170° C. for 3 hours while maintaining the pressure constant at 100 p.s.i.g. by the occasional injection of carbonyl sulfide. At the end of this time, the reaction mixture was cooled to room temperature and excess gases vented from the autoclave. The autoclave was then opened and 700 ml. of diethyl ether and 200 ml. of water added to the reaction mixture to form two phases. Separation of the two phases was effected and the aqueous phase was saturated with sodium chloride, acidified with hydrochloric acid to a pH of 4, and neutralized with a sodium bicarbonate solution. This neutralized solution was then extracted with two 200 ml. portions of diethyl ether and the ether phase obtained combined with the first ether phase obtained. The combined ether phases were then dried over magnesium sulfate, filtered, and evaporated under vacuum to obtain an oil which was distilled to obtain a 64 g. fraction boiling at 102–137° C./0.05 mm. Hg. This fraction was then redistilled to obtain 55.9 g. of isooctyl salicylate boiling 106–116.5° C./0.1 mm. Hg. The infrared spectrum of this product was found to be identical with that of an authentic sample of isooctyl salicylate.

*Example 4*

Sodium phenoxide was prepared by heating a mixture of 200 g. (2.1 mole) of phenol, 150 ml. of isooctyl alcohol, 200 ml. of toluene and a solution of sodium hydroxide containing 30 g. (0.75 mole) of NaOH in a bottom-stirred autoclave at a temperature of 180° C. under an atmosphere of nitrogen until all the water was azeotropically distilled with the toluene. The autoclave was thereafter sealed and carbonyl sulfide was introduced to obtain a pressure of 80–100 p.s.i.g. The reaction mixture was heated at this pressure and a temperature of 180–185° C. for a period of 1 hour. At the end of this time, the autoclave was cooled over a period of 65 hours and the excess gases removed by venting through a potassium hydroxide solution. Thereafter, the autoclave was opened and 800 ml. of diethyl ether added to the reaction mixture which was then filtered to separate out the precipitated solids. The filtrate obtained was evaporated at 30–50° C./20 mm. Hg to ½ volume and the solid precipitating out separated by filtration. The filtrate obtained from this filtration was concentrated at 50–100° C./20 mm. Hg to obtain a hygroscopic solid which was separated by filtration. The filtrate from this last filtration was concentrated at a temperature of 89–91° C./20 mm. Hg to obtain a dark red liquid. The solid materials obtained in each filtration were then combined and triturated with 800 ml. of dry diethyl ether. The solid material was separated from the ether by filtration and dissolved in a solution containing 200 ml. of tetrahydrofuran and 20 ml. of water. Thereafter, 400 ml. of water was added with the formation of two phases. The organic phase was separated and extracted with two 100 ml. portions of diethyl ether. The diethyl ether solutions obtained were then combined, dried over magnesium sulfate, and evaporated at 20 mm. Hg to obtain oil which was distilled to obtain the isooctyl salicylate boiling at 110–114° C./0.3 mm. Hg. Analysis of this compound was found to be 72.60 wt. percent carbon and 8.92 wt. percent hydrogen as compared with calculated values of 71.97 wt. percent carbon and 8.86 wt. percent hydrogen. An infrared spectrum of this product was found to be identical with that of an authentic sample of isooctyl salicylate.

Reasonable variation and modification of the invention as described are possible, the essence of which is that there have been provided methods for preparing the esters of salicylic acid in a simple and indirect manner by interacting aryloxide salt with carbonyl sulfide and an alkanol in a phenol reaction mixture.

I claim:

1. The method which comprises reacting a phenoxide salt, wherein the non-salt sites of the phenyl radical nucleus is free from substituents other than alkyl radicals containing less than 12 carbon atoms and the salt-forming cation is selected from the group consisting of alkali metal, alkaline earth metal and quaternary ammonium cations free from other than hydrocarbyl substituents, with carbonyl sulfide and an alkanol containing up to 20 carbon atoms at an elevated temperature less than 200° C. in an anhydrous reaction medium containing a phenol, wherein aside from the phenolic functional group said phenol is free from other than carbon and hydrogen atoms and no alkyl group substituent thereto contains more than 8 carbon atoms, and recovering the alkyl salicylate as product.

2. The method which comprises reacting a phenoxide salt of the formula

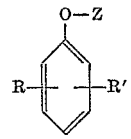

wherein R and R′ are selected from the group consisting of hydrogen and alkyl radicals containing less than 12 carbon atoms, R and R′ being either the same or different, and Z is a salt-forming cation selected from the group consisting of alkali metal, alkaline earth metal, and quaternary ammonium cations, which quaternary ammonium cations are free from other than hydrocarbyl substituents with carbonyl sulfide and an alkanol containing up to 20 carbon atoms at an elevated temperature less than 200° C. in an anhydrous reaction medium containing a phenol, wherein aside from the phenolic functional group said phenol is free from other than carbon and hydrogen atoms and no alkyl group substituents thereto contains more than 8 carbon atoms, and recovering from the resulting reaction mixture an alkyl salicylate of the formula

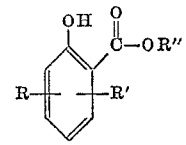

wherein R and R′ are as above defined and R″ is an alkyl radical containing up to 20 carbon atoms.

3. The method of claim 2 wherein said salt-forming cation is an alkali metal cation.

4. The method which comprises reacting a phenoxide salt of the formula

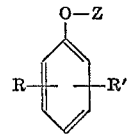

wherein R and R′ are selected from the group consisting of hydrogen and alkyl radicals containing less than 12 carbon atoms, R and R′ being either the same or different, and Z is a salt-forming cation selected from the group consisting of alkali metal, alkaline earth metal, and quaternary ammonium cations, which quaternary ammonium cations are free from other than hydrocarbyl substituents with carbonyl sulfide and an alkanol containing up to 20 carbon atoms at a temperature in the range of 150–200° C. in an anhydrous reaction medium containing a phenol, wherein aside from the phenolic functional group said phenol is free from other than carbon and hydrogen atoms and no alkyl group substituent thereto contains more than 8 carbon atoms, to form a reaction mixture containing an alkyl salicylate of the formula

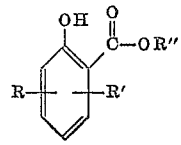

wherein R and R' are as above defined and R'' is an alkyl radical containing up to 20 carbon atoms and recovering from said reaction mixture said alkyl salicylate as product.

5. The method of claim 4 wherein said salt-forming cation is an alkali metal cation.

6. The method of claim 4 wherein salt-forming cation is sodium and said anhydrous reaction medium is phenol.

7. The method comprising reacting sodium phenoxide with carbonyl sulfide and isooctyl alcohol at a temperature in the range of 150–200° C. and a pressure in the range of from atmospheric to 1000 p.s.i. in an anhydrous phenol reaction medium to form isooctyl salicylate and recovering said isooctyl salicylate as product.

References Cited in the file of this patent
UNITED STATES PATENTS
2,824,892   Barkley _____ Feb. 25, 1958

OTHER REFERENCES
From: Chemical Reviews, vol. 57, pp. 626–40 (1957).